US011595435B2

United States Patent
Singh et al.

(10) Patent No.: US 11,595,435 B2
(45) Date of Patent: Feb. 28, 2023

(54) METHODS AND SYSTEMS FOR DETECTING PHISHING EMAILS USING FEATURE EXTRACTION AND MACHINE LEARNING

(71) Applicant: EC-Council International Limited, Hong Kong (HK)

(72) Inventors: Maninder Pal Singh, Kuala Lumpur (MY); Aditya Bhardwaj, Greater Noida (IN)

(73) Assignee: EC-Council International Limited, Hong Kong (HK)

( * ) Notice: Subject to any disclaimer, the term of this patent is extended or adjusted under 35 U.S.C. 154(b) by 276 days.

(21) Appl. No.: 16/812,693

(22) Filed: Mar. 9, 2020

(65) Prior Publication Data
US 2021/0281606 A1 Sep. 9, 2021

(51) Int. Cl.
*G06N 20/00* (2019.01)
*H04L 9/40* (2022.01)
*G06Q 10/107* (2023.01)
*G06N 5/04* (2023.01)

(52) U.S. Cl.
CPC ........... *H04L 63/1483* (2013.01); *G06N 5/04* (2013.01); *G06N 20/00* (2019.01); *G06Q 10/107* (2013.01); *H04L 63/1416* (2013.01)

(58) Field of Classification Search
CPC ............. H04L 63/1483; H04L 63/1416; H04L 51/212; H04L 51/18; G06N 5/04; G06N 20/00; G06N 3/0454; G06N 3/08; G06N 7/005; G06Q 10/107
See application file for complete search history.

(56) References Cited

U.S. PATENT DOCUMENTS

| 9,888,016 | B1 | 2/2018 | Amin et al. |
| 10,230,754 | B2 | 3/2019 | Oberheide |
| 10,243,989 | B1* | 3/2019 | Ding ..................... H04L 63/145 |
| 10,367,849 | B2 | 7/2019 | Yang et al. |
| 10,454,954 | B2 | 10/2019 | Burgis |
| 10,567,430 | B2 | 2/2020 | Bhageria et al. |
| 10,574,696 | B2* | 2/2020 | Celik ..................... H04L 51/212 |
| 10,851,908 | B2 | 3/2020 | Hunt et al. |
| 2017/0026388 | A1* | 1/2017 | Gatti ................... H04L 63/1483 |
| 2019/0044975 | A1* | 2/2019 | Schafer ................ G06Q 10/107 |
| 2019/0260780 | A1* | 8/2019 | Dunn .................... H04L 51/212 |

(Continued)

OTHER PUBLICATIONS

Definition Email, WhatIs.Com, Contributor(s): Kate Brush and Kevin Ferguson, Downloaded Jan. 20, 2020.

(Continued)

*Primary Examiner* — Aftab N. Khan
(74) *Attorney, Agent, or Firm* — Ortiz & Lopez, PLLC; Kermit D. Lopez; Luis M. Ortiz (57) ABSTRACT

Methods and systems for detecting a phishing attack on a computer device can involve scanning one or more email messages, and separating email parts from the one or more email messages, in response to scanning the at least one email message. In addition, the email parts of the at least one email message can be subject to a feature extraction operation. The email features extracted from the email parts can be then analyzed to determine whether or not any of the email features contain suspected phishing content, confirmed phishing content and benign email content.

12 Claims, 4 Drawing Sheets

(56) References Cited

U.S. PATENT DOCUMENTS

| | | | |
|---|---|---|---|
| 2019/0268373 A1 | 8/2019 | Celik | |
| 2019/0349400 A1* | 11/2019 | Bruss | G06N 5/003 |
| 2019/0394236 A1 | 12/2019 | Bhageria et al. | |
| 2020/0019889 A1 | 1/2020 | Keanini et al. | |
| 2020/0020339 A1 | 1/2020 | Chae | |
| 2020/0358819 A1* | 11/2020 | Bowditch | G06K 9/6267 |
| 2021/0211462 A1* | 7/2021 | Birch | H04L 63/0236 |
| 2021/0266345 A1* | 8/2021 | Chen | H04L 63/1425 |
| 2021/0344693 A1* | 11/2021 | Azad | G06F 21/53 |

OTHER PUBLICATIONS

"Feature extraction", Wikipedia, Retrieved from "https://en.wikipedia.org/w/index.php?title=Feature_extraction&oldid=933930902", page last edited on Jan. 3, 2020, at 20:12 (UTC).

"Feature Extraction", https://deepai.org/, downloaded Jan. 21, 2020.

"Machine learning", Wikipedia, Retrieved from "https://en.wikipedia.org/w/index.php?title=Machine_learning&oldid=936849201", page last edited on Jan. 21, 2020, at 11:21 (UTC).

"Tokenization (data security)", Wikipedia, Retrieved from "https://en.wikipedia.org/w/index.php?title=Tokenization_(data_security)&oldid=922261413", page last edited on Oct. 21, 2019, at 00:36 (UTC).

Tokenizer reference | Elasticsearch Reference [7.5] | Elastic, downloaded Jan. 21, 2020.

X. MahaLakshmi, N. Swapna Goud, Dr. G. Vishnu Murthy; "A Survey on Phishing And It's Detection Techniques Based on Support Vector Method (SVM) and Software Defined Networking(SDN)"; International Journal of Engineering and Advanced Technology (IJEAT) ISSN: 2249-8958, vol. 8, Issue-2S, Dec. 2018.

Samuel Marchal, et al., "Know Your Phish: Novel Techniques for Detecting Phishing Sites and their Targets"; Apr. 25, 2016; arxiv.org.

Ian Fette, Norman Sadeh, and Anthony Tomasic; "Learning to Detect Phishing Emails", CMU-ISRI-06-112, Jun. 2006, this report also appears as Carnegie Mellon Cyber Laboratory, Technical Report CMU-CyLab-06-012.

Eint Sandi Aung, Chaw Thet Zan, and Hayato Yamana; "A Survey of URL-based Phishing Detection", DEIM Forum 2019 G2-3.

Baidyanath Biswas and Arunabha Mukhopadhyay, "Phishing Detection and Loss Computation Hybrid Model, A Machine-learning Approach", ISACA Journal, vol. 1, Jan. 1, 2017.

* cited by examiner

METHODS AND SYSTEMS FOR DETECTING PHISHING EMAILS USING FEATURE EXTRACTION AND MACHINE LEARNING

TECHNICAL FIELD

Embodiments are related to computer security and in particular, the field of cybersecurity. Embodiments further relate to protecting against phishing attacks.

BACKGROUND

The Internet has significantly and dramatically changed the way people live and communicate. The Internet allows users access to a vast number of resources from locations around the world. In addition, the Internet allows users to perform commercial transactions and share private and sensitive information. A significant concern when browsing the Internet is the vulnerability of the equipment, the data, and the information to attacks from malicious individuals or organizations. Thus, the security of the equipment and information is an important challenge.

One type of fraudulent act over the Internet is known as phishing, which has become one of the fastest growing online threats. In the last few years, there have been significant increases in the number of phishing attacks over the Internet, and thus users are now looking for effective ways for blocking such attacks.

Phishing refers to an attempt to fraudulently retrieve sensitive information, such as bank account information, social security numbers, passwords, and credit card information, by masquerading as a trustworthy person or business with a proper need for such information.

In a phishing attack, an individual may receive a message, commonly in the form of an e-mail directing the individual to perform an action, such as opening an e-mail attachment or following (e.g., using a cursor controlled device or touch screen) an embedded link. If such message were from a trusted source (e.g., a co-worker, a known bank or utility company), then such action might carry little risk. In a phishing attack, such message is from an attacker (e.g., an individual using a computing device to perform a malicious act on another computer device user) disguised as a trusted source, and an unsuspecting individual, for example, opening an attachment to view a "friend's photograph" might in fact install malicious computer software (i.e., spyware, a virus, and/or other malware) on his or her computer. Similarly, an unsuspecting individual directed to a webpage made to look like an authentic login or authentication webpage might be deceived into submitting his or her username, password or other sensitive information to an attacker.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for scanning and protection against phishing attacks It is another aspect of the disclosed embodiments to provide for a method and system for the on-demand detection of phishing emails.

It is a further aspect of the disclosed embodiments to provide for a method and system for the continuous monitoring and prevention of phishing emails.

The aforementioned aspects and other objectives and advantages can now be achieved as described herein. In an embodiment, a method for detecting a phishing attack on a computer device, can involve scanning at least one email message; separating email parts from the at least one email message, in response to scanning the at least one email message; subjecting the email parts of the at least one email message to a feature extraction operation; and analyzing email features extracted from the email parts to determine whether or not any of the email features contain suspected phishing content, confirmed phishing content and benign email content.

In an embodiment of the method, the email parts can be separated from the at least one email message by a tokenizer.

In an embodiment of the method, the email parts separated from the at least one email message can comprise at least one of: an email attachment, an email body, an email text body, an email header, and a network associated with the at least one email message.

In an embodiment of the method, analyzing email features extracted from the email parts can further comprise analyzing HTML body data and text data associated with the at least one email message.

In an embodiment of the method, scanning the at least one email message further can comprise scanning the at least one email message on an on-demand basis.

In an embodiment of the method, scanning the at least one email message further can comprise scanning the at least one email message on a continuous basis.

In an embodiment of the method, analyzing the email features extracted from the email parts can further comprise collecting the email features extracted from the email parts; and subjecting the email features after the feature extraction operation to AI (Artificial Intelligence) and machine learning model training prior to determining if any of the email features contain suspected phishing content, confirmed phishing content and benign email content.

In an embodiment, a system for detecting a phishing attack on a computer device, can comprise at least one processor, and a non-transitory computer-usable medium embodying computer program code. The computer-usable medium is capable of communicating with the at least one processor, and the computer program code can include instructions executable by the at least one processor and configured for: scanning at least one email message; separating email parts from the at least one email message, in response to scanning the at least one email message; subjecting the email parts of the at least one email message to a feature extraction operation; and analyzing email features extracted from the email parts to determine whether or not any of the email features contain suspected phishing content, confirmed phishing content and benign email content.

In an embodiment of the system, the instructions for separating email parts from the at least one email message, can further comprise instructions configured for separating the email parts from the at least one email message by a tokenizer.

In an embodiment of the system, the email parts separated from the at least one email message can comprise at least one of: an email attachment, an email body, an email text body, an email header, and a network associated with the at least one email message.

In an embodiment of the system, the instructions configured for analyzing email features extracted from the email parts, can further comprise instructions configured for analyzing HTML body data and text data associated with the at least one email message.

In an embodiment of the system, the instructions configured for scanning the at least one email message, can further comprise instructions configured for scanning the at least one email message on an on-demand basis.

In an embodiment of the system, the instructions for scanning the at least one email message can further comprise instructions configured for scanning the at least one email message on a continuous basis.

In an embodiment of the system, the instructions configured for analyzing the email features extracted from the email parts, can further comprise instructions configured for: collecting the email features extracted from the email parts; and subjecting the email features after the feature extraction operation to AI (Artificial Intelligence) and machine learning model training prior to determining if any of the email features contain suspected phishing content, confirmed phishing content and benign email content.

In another embodiment, a system for detecting a phishing attack on a computer device, can comprise a tokenizer for separating email parts from at least one email message, in response to scanning the at least one email message; and a feature extractor for subjecting the email parts of the at least one email message to a feature extraction operation, wherein email features extracted from the email parts are analyzed to determine whether or not any of the email features contain suspected phishing content, confirmed phishing content and benign email content.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description, serve to explain the principles of the disclosed embodiments.

DETAILED DESCRIPTION

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

A "computing device" or "electronic device" or "data processing system" or I/O (Input/Output) device can refer to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

Figure 4:
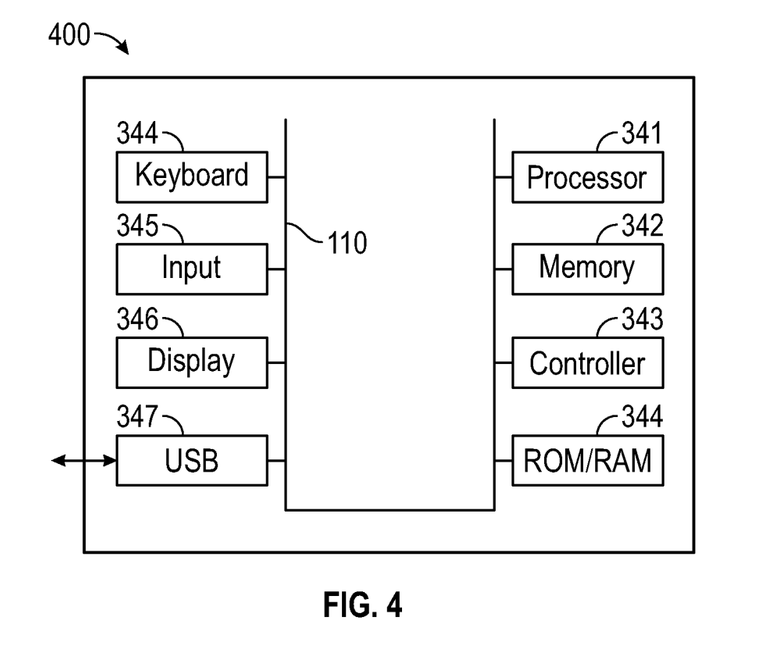
FIG. 4 illustrates a schematic view of a computer system, in accordance with an embodiment.
Figure 5:
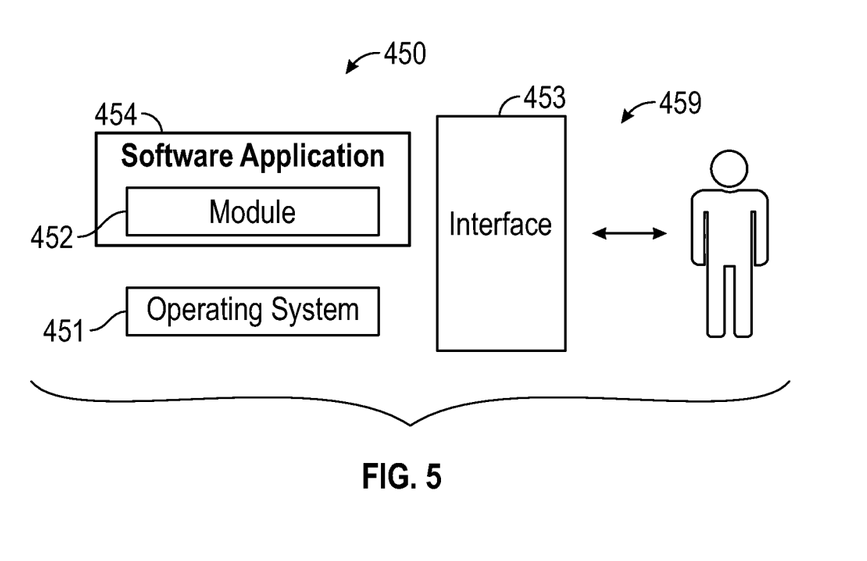
FIG. 5 illustrates a schematic view of a software system including a module, an operating system, and a user interface, in accordance with an embodiment.

Various elements of an example of a computing device or processor are described herein with reference to FIG. 4 and FIG. 5.

The term "server" as utilized herein can relate to a computer (e.g., data-processing system), a device or a program that may be dedicated to managing network resources and which can process requests and deliver data to another computer, device or data-processing system over the Internet or another network (e.g., a local network).

The term "tokenizer" as utilized herein can refer to a module, feature or method that can parse raw emails to extract email objects like headers, textual part, html part, attachments, etc. These objects can be further tokenized (in a second pass) to collect information such as sender domain, DMARC signatures (from headers), URLs (from HTML part), etc, as discussed in greater detail herein.

The disclosed embodiments relate to methods and systems for detecting and/or preventing email phising attacks on organizations and/or individuals. As will be discussed in greater detail herein, embodiments can involve the scanning of emails for malicious attachments, an email body, an email text body, email headers and an analysis of the network for suspicious content that may be harmful for a user's network. The following checks can include, but not but are not limited to attachment scanning, email HTML body/text analysis, email headers, and network analysis. At a basic level, the disclosed approach can include two approaches for assisting end users and organizations in the detection of phishing attaches and the protection against such phishing attacks. This approach can involve the on-demand detection of emails, and the continuous monitoring and prevention of phishing emails.

Note that the term "email" as utilized herein can refer to "electronic mail" which can involve the exchange of computer-stored messages by telecommunication. Email messages are usually encoded in American Standard Code for Information Interchange (ASCII) text. However, one can also send nontext files—such as graphic images and sound files—as attachments sent in binary streams. Email was one of the first activities performed over the Internet and is still the most popular use. A large percentage of the total traffic over the Internet is email. Email can also be exchanged between online server provider users and in networks other than the Internet, both public and private. The term "email" or "e-mail" may refer to a single electronic message or a group of electronic messages.

Figure 1:
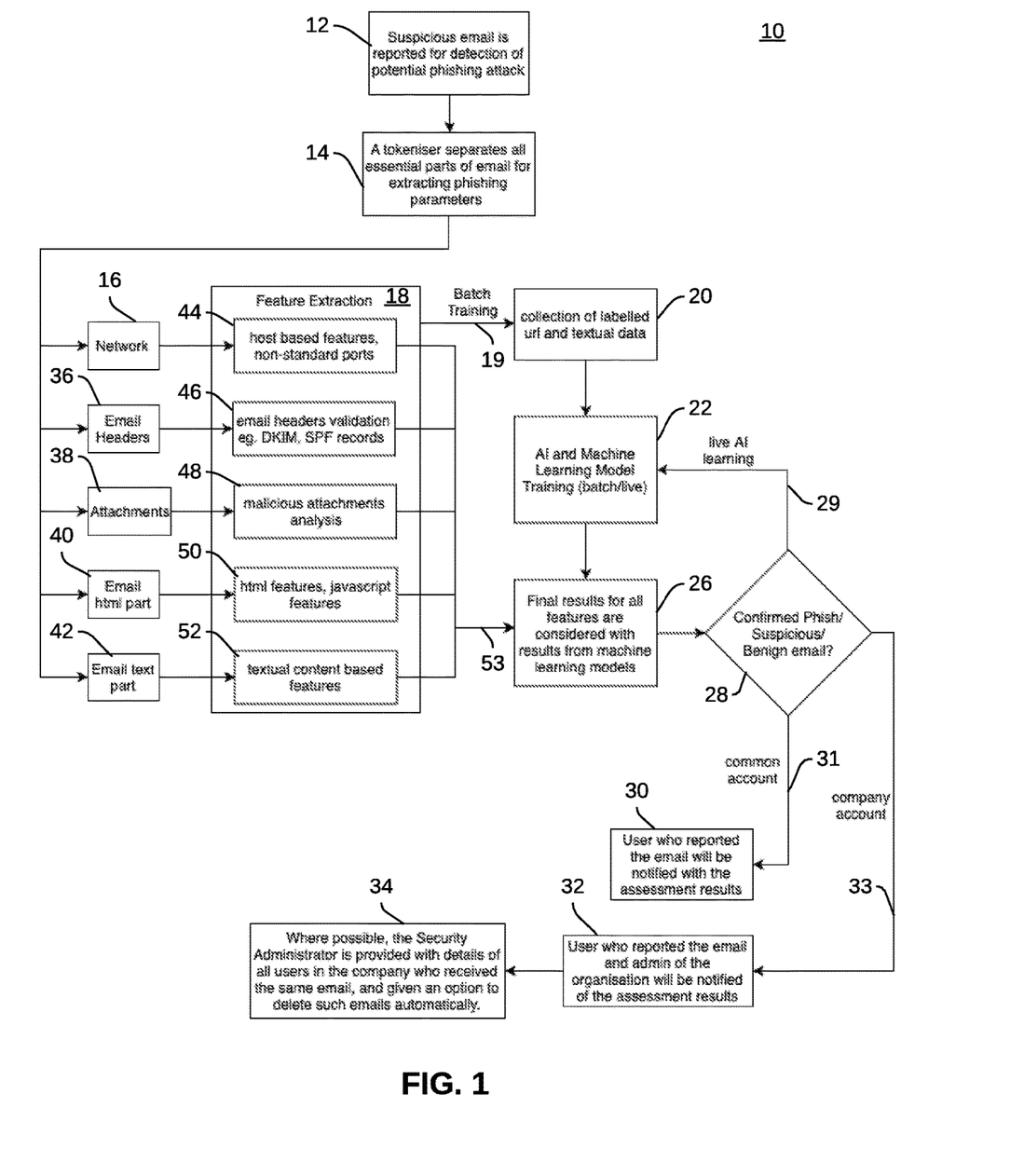
FIG. 1 illustrates a flow chart of operations depicting logical operational steps or instructions of a method for on-demand detection and scanning of email, in accordance with an embodiment.

FIG. 1 illustrates a flow chart of operations depicting logical operational steps or instructions of a method 10 for on-demand detection and scanning of email, in accordance with an embodiment. As indicated at block 12, a step or operation can be implemented in which a suspicious email is reported for detection of a potential phishing attack. Thereafter, as depicted at block 14, a step or operation can be implemented in which a tokenizer separates all essential parts of the email for extracting phishing parameters. That is, the tokenizer parses raw email for different objects, namely email headers, email textual part, email html part, email attachments. These email objects can be further tokenized in a manner, which aims to collect relevant information such as the sender domain, DMARC signatures from email headers, URLs from HTML part, etc. This data (e.g., items/parameters) can be analyzed to determine whether or not it is a phishing email.

Next, five possible operations are possible. As shown at block 16, network information separated from the email may be subject to a feature extraction operation as shown at block 18, including the extraction of host based features and non-standard ports, as depicted at block 44. A feature extractor may be utilized to perform the feature extraction operation or feature extraction technique. As shown next at block 36, email header information separated from the email may be subject to the feature extraction operation/technique indicated at block 18 including the extraction of email headers for validation (e.g., DKIM, SPF records) as shown at block 46.

Feature extraction operations or feature extractions techniques that can be utilized by the aforementioned feature extractor can include, for example, feature extraction techniques/operations such as PCA (Principal Components Analysis), ICA (Independent Component Analysis), LDA (Linear Discriminant Analysis), LLE (Locally Linear Embedding), t-SNE (t-distributed Stochastic Neighbor Embedding) and AE (Autoencoders). Feature Extraction aims to reduce the number of features in a dataset by creating new features from the existing ones (and then discarding the original features).

As depicted at block 38, attachment information separated from the email may be subject to the feature extraction operation shown at block 18 including a specific operation for malicious attachments analysis, as depicted at block 48. Additionally, as shown at block 40, email HTML part information separated from the email may be subject to the feature extraction operation shown at block 18 including extraction of HTML features and JavaScript features, as depicted at block 50. Furthermore, email text part information, as shown at block 42 can be subject to the feature extraction operation depicted at block 18 including the extraction of textual content based features, as depicted at block 52.

Note that the term "feature extraction" as utilized herein can involve reducing the number of resources required to describe a large set of data. When performing analysis of complex data one of the major problems stems from the number of variables involved. Analysis with a large number of variables generally requires a large amount of memory and computation power. Note that we are actually carrying out "feature extraction" to obtain useful information/data only. As mentioned earlier, the first tokenizer can break down the email into different parts, while the second tokenizer can extract the exact information/parameters that may be required in the feature extraction stage. The number/count of resources can increase after feature extraction.

Additionally, a large number of variables may cause a classification algorithm to over fit to training samples and generalize poorly to new samples. Feature extraction is a general term for methods of constructing combinations of the variables to get around these problems while still describing the data with sufficient accuracy.

Following processing of the feature extraction operations shown at block 18, batch training data as indicated by arrow 19 can be subject to an operation involving the collection of labeled URL, images, attachments, textual data and other labeled features, as depicted at block 20. Next, as illustrated at block 22, the data can be subject to AI (Artificial Intelligence) and machine learning training (e.g., batch/live) as shown at block 22.

Note that the term AI (Artificial Intelligence) as utilized herein can relate to the field of artificial intelligence or a methodology for making artificial intelligence. AI can refer to the simulation of human intelligence processes by machines, especially computer systems. Specific applications of AI include expert systems, natural language processing, NLP, speech recognition and machine vision, to name a few AI examples. The term "machine learning", on the other hand, can relate to an application of AI that can provide a system with the ability to automatically learn and improve from experience without being explicitly programmed. Machine learning can also relate to the field of defining various issues dealt within the field of AI and studying methodology for solving the various issues. Machine learning can be defined as an algorithm that enhances the performance of a certain task through a steady experience with the certain task.

Examples of machine learning algorithms that can be utilized to implement machine learning with respect to the step or operation shown at block 22 can include supervised learning, unsupervised learning, reinforcement learning, self learning, feature learning, sparse dictionary learning, anomaly detection and association rules.

Following processing of the operation shown at block 22, a step or operation can be implemented in which final results for all features can be considered with results from machine learning models. Examples of such machine learning models can include artificial neural networks, decision trees, support vector machines, regression analysis, Bayesian networks, and genetic algorithms.

Note that data output as a result of the feature extraction operation shown at block 18 can also be subject, as depicted at block 53, to the step or operation illustrated at block 26. Next, as shown at decision block 28, a step or operation can be implemented in which phishing and/or suspicious email and/or a benign email message is confirmed. Depending on the outcome of the step or operation illustrated at the decision block 28, a live AI learning operation can be implemented, as shown at arrow 29, information can be provided via a common account, as indicated at arrow 31, or information can be provided via a company account, as indicated at arrow 33.

Assuming the common account path as indicated by arrow 31, then as shown at block 30, a step or operation can be implemented in which the user who reported the email can be notified with the assessment results. Assuming the company account path, as shown at arrow 33, a step or operation can be implemented in which the user who reported the email and the administration of the organization can be notified of the assessment results.

Thereafter, as illustrated at block 34, a step or operation can be implemented where possible, a security administrator can be provided with details of all users in the company who received the same email, and can be provided with an option to delete such email(s) automatically.

Figure 2:
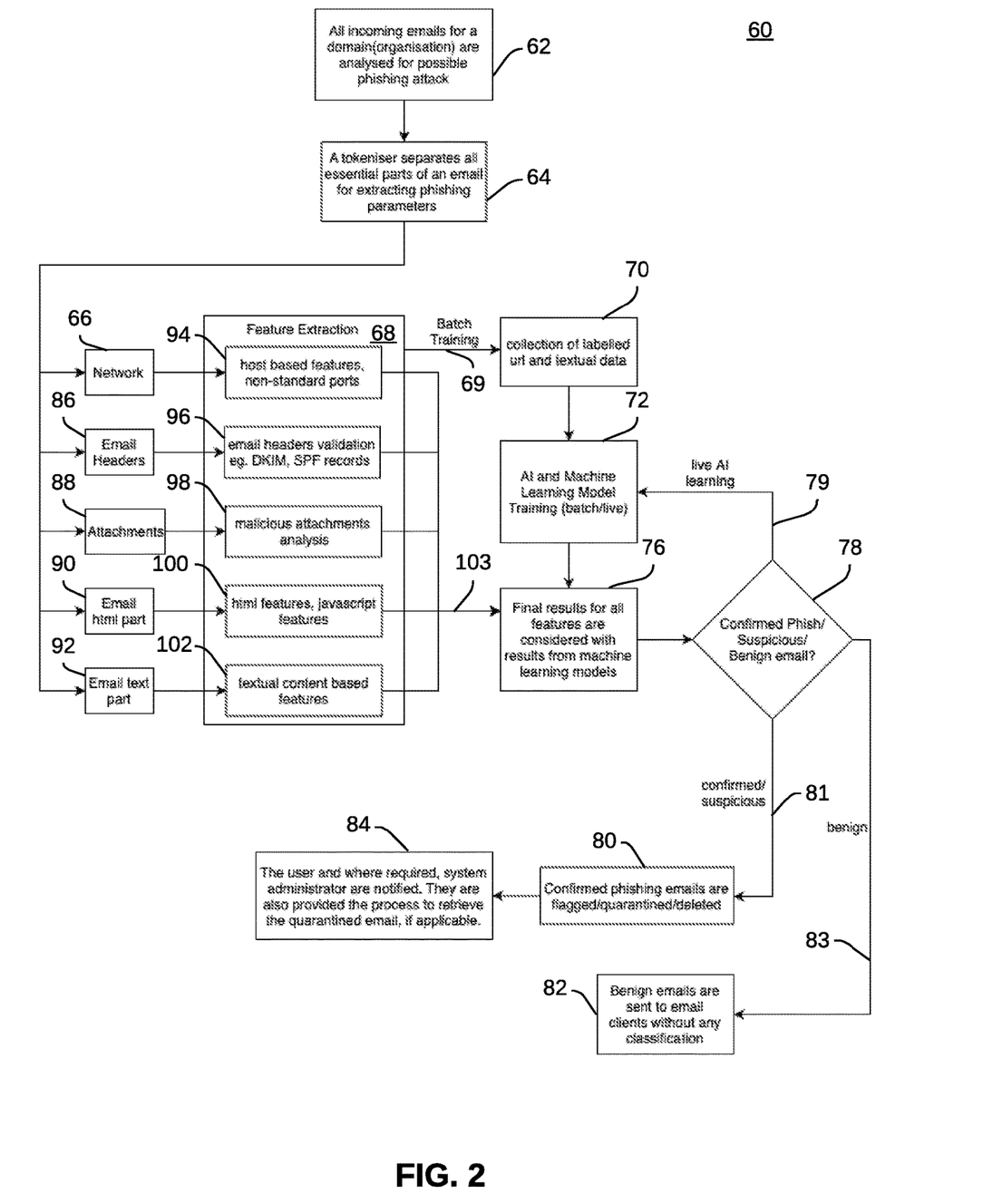
FIG. 2 illustrates a flow chart of operations depicting logical operational steps or instructions of a method for the continuous monitoring and prevention of phishing emails, in accordance with an embodiment.

FIG. 2 illustrates a flow chart of operations depicting logical operational steps or instructions of a method 60 for the continuous monitoring and prevention of phishing emails, in accordance with an embodiment. As shown at block 62, a step or operation can be implemented for analyzing all incoming emails for a domain (e.g., a domain associated with a particular company or organization) for a possible phishing attack. Next, as shown at block 64, a step or operation can be implemented in which a tokenizer separates all essential parts of an email for extracting phishing parameters. As discussed previously, the tokenizer actually parses raw email for different objects, namely email headers, email textual part, email html part, email attachments. These email objects can be further tokenized in a way which aims to collect relevant information such as sender domain, DMARC signatures from email headers, URLs from HTML part, etc. This information/data (e.g., items/parameters) can be analyzed to determine whether it is a phishing email or not.

Note that the aforementioned "essential" parts can include network information as shown at block 66, email headers as depicted at block 86, attachments as indicated at block 88, email HTML part data as illustrated at block 90, and email text part data as described at block 92. The various data depicted at block 66, block 86, block 88, block 90, and block 92 can be subject to a feature extraction operation as depicted at block 68.

As depicted at block 94, host-based features and non-standard port data can be extracted from the network data. As shown at block 96, email headers can be extracted for validation of data (e.g., DKIM, SPF records). As illustrated at block 98, attachments can be subject to a malicious attachments analysis. As indicated at block 100, HTML features and JavaScript features can be extracted from the email HTML part data. In addition, as depicted at block 102, textual content-based features can be extracted from the email text part data. Batch training data as indicated by arrow 69 can be subject a step or operation, as shown at block 70, in which labeled URL, images, attachments, textual data and other labeled features can be collected.

Thereafter, as depicted at block 72, a step or operation can be implemented involving AI and machine learning model training (batch/live), followed by a step or operation, as shown at block 76 in which final results for all features can be considered with results from one or more machine learning models. Note that the machine learning model training can implement one or more possible types of machine learning algorithms.

A first type of machine learning algorithm, which can be utilized to implement the aforementioned machine learning model training, as shown at block 72, is a batch learning algorithm, which works under the assumption that the entire training data can be available prior to the training task. Machine Learning models using batch learning algorithms can be trained on already available data for malicious content present in emails like phishing URLs, attachments containing malwares, spam textual data, etc. Examples of such algorithms include, but are not limited to BERT (Bidirectional Encoder Representations from Transformers) for text classification, Support Vector Machine algorithms for classifying URLs as malicious or benign followed by multi-label classification on the malicious URLs using Random, a k-Labelset algorithm, a CNN (Convolutional Neural Network) algorithm for Logo detection, text extraction for images and CNN-BiLSTM for malware classification in attachments, K-nearest neighbors algorithm for clustering in forensic analysis on log data, and LSTM (Long Short Term Memory) algorithm for anomaly detection for time series log data.

A second type of algorithm that can be utilized to implement the aforementioned machine learning model training, as shown at block 72 is an online learning algorithm, which treats the data as a stream of instances, and learns a prediction model by sequentially making predictions and updates. Online learning can increase the scalability of batch learning by updating the weight vectors for classification sequentially by utilizing information with training data. Examples of online learning algorithms that can be adapted for use with varying embodiments include, but are not limited to an Online Gradient Descent algorithm for updating the weight vectors by applying Stochastic gradient descent principle only to a single training instance arriving sequentially, and an Extended Isolated Forest Algorithm for detecting anomalous user behavior.

Note that data output as a result of the feature extraction operation depicted at block 68 can be provided as input, as shown at block 103, to the step or operation illustrated at block 76.

Following processing of the step or operation shown at block 76, a test can be performed, as shown at decision block 78, to confirm phishing, a suspicious email, or if the email(s) at issue is benign. Assuming confirmation of an actual phishing, the email and/or data associated with the email issue can be subject to a live AI learning operation, as shown at arrow 79 and AI and machine learning training (batch/live) as depicted at block 72. The process shown in block 76 and decision block 78 can be then repeated. Assuming that a confirmation/suspicious email has been confirmed as shown at arrow 81, then a step or operation can be implemented in which the confirmed phishing email(s) are flagged, quarantined and/or deleted.

Thereafter, as illustrated at block 84, a step or operation can be implemented in which user and where required, the system administrator can be notified. Such personnel can also be provided with a process for retrieving the quarantined email, if applicable. Assuming that benign email(s) are confirmed as indicated by arrow 83, a step or operation can be implemented in which the benign emails are sent to email clients without any classification.

FIG. 1 and FIG. 2 thus illustrate an approach for the reliable detection of phishing emails. Current anti-spam technologies, for example, fail to detect phishing (especially spear Phishing) emails reliably, but this process can offer an efficient and reliable approach for detecting phishing emails. In addition, this approach can allow organizations (e.g., government, corporate, small businesses, non-profits, etc) to protect against mass phishing attacks based on timely reporting accomplished by, for example, only one of their users.

While there may be a number of conventional approaches for detecting/protecting against spam emails, the disclosed solution can assist in reliably detecting and protecting against email phishing attacks, which can account for more than 90% of cyber-attacks. The disclosed approach can provide real time protection with or without human intervention (depending on what the organization chooses).

Figure 3:
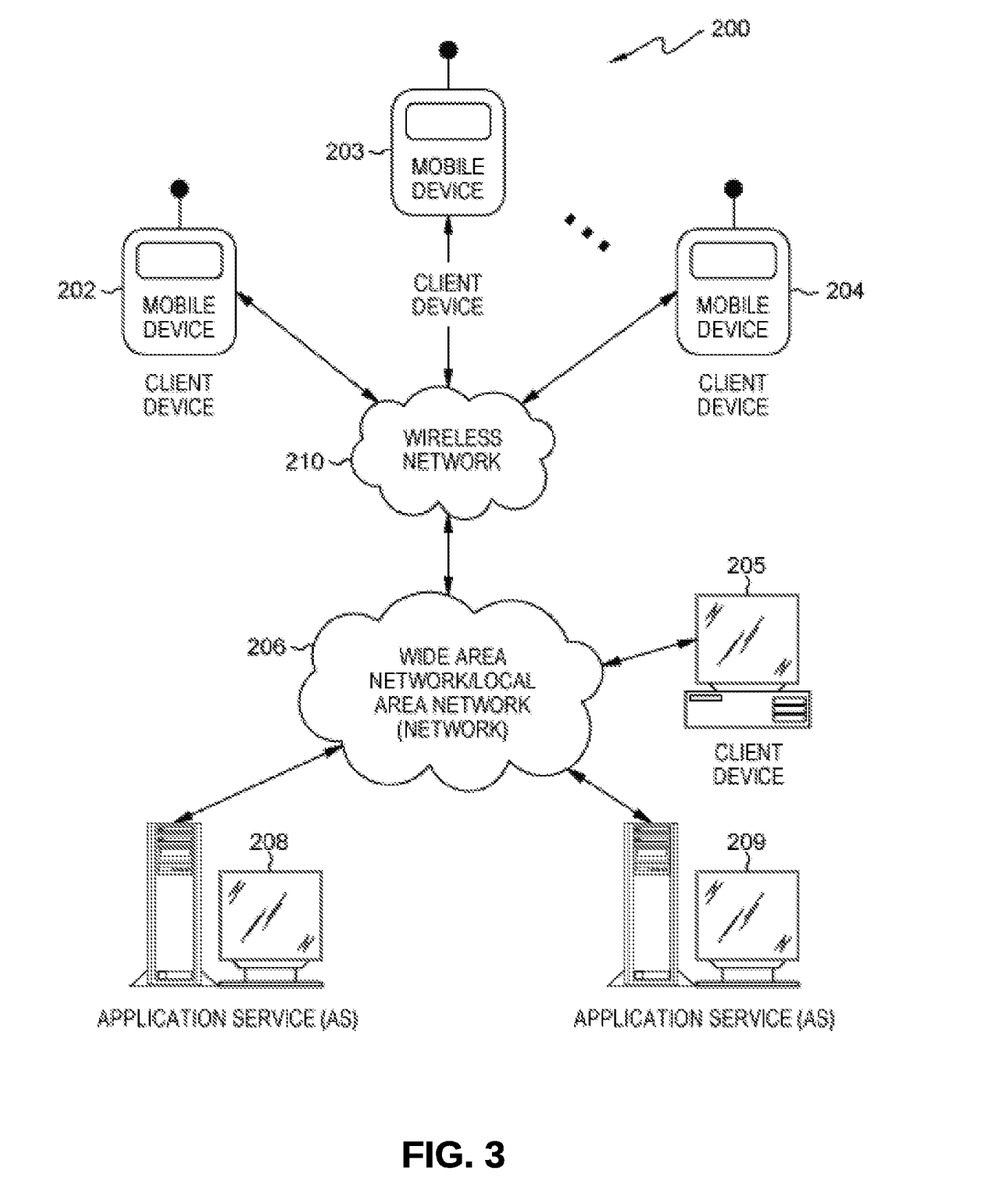
FIG. 3 illustrates a computer network environment that may be used to implement an embodiment.

FIG. 3 shows components of an exemplary environment 200 in which an embodiment may be practiced. Not all the illustrated components may or may not be required to practice the embodiments, and variations in the arrangement and type of the components may be made without departing from the spirit or scope of the embodiments. As shown, system 200 of FIG. 3 can include local area networks ("LANs")/wide area network 206, a wireless network 210, one or more mobile devices 202-204, at least one client device 205, and one or more application services (AS) 208-209.

Generally, mobile devices 202-204 may include virtually any portable computing device that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 can be configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 can include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 308-309 are not limited to web servers. Those of ordinary skill in the art will appreciate that the architecture and hardware depicted in FIG. 3 may vary.

As can be appreciated by one skilled in the art, embodiments can be implemented in the context of a method, data processing system, or computer program product. Accordingly, embodiments may take the form of a hardware embodiment, a software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages or in a visually oriented programming environment.

The program code may execute on a user's computer, partly on a user's computer, as a stand-alone software package, or partly on a user's computer and partly on a remote computer or on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein. Examples of instructions means can include, for example, the various steps, operations or instructions shown in the various blocks in FIG. 1 and FIG. 2.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 4 and FIG. 5 are shown only as exemplary diagrams of data-processing environments in which example embodiments may be implemented. It should be appreciated that FIG. 4 and FIG. 5 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 4, some embodiments may be implemented in the context of a data-processing system 400 that can include, for example, one or more processors such as processor 341, which may be a CPU (Central Processing Unit) and/or another type of processor (e.g., a microprocessor, a microcontroller, etc). The data-processing system 400 can further include a memory 342, a controller 343 (e.g., an input/output controller), and another memory such as ROM/RAM (Read Only Memory/Random Access Memory) 344. The data-processing system 400 can further include a peripheral USB (Universal Serial Bus) connection 347, a keyboard 344 and/or another input device 345 (e.g., a pointing device such as a mouse, trackball, pen device, etc.), and a display 346 (e.g., a monitor, touch screen display, etc). The data-processing system 400 depicted in FIG. 4 is an example of an I/O device.

As illustrated, the various components of data-processing system 400 can communicate electronically through a system bus 110 or similar architecture. The system bus 110 may be, for example, a subsystem that transfers data between, for example, computer components within data-processing system 400 or to and from other data-processing devices, components, computers, etc.

The data-processing system 400 may be implemented in some embodiments as, for example, a server in a client-server based network (e.g., the Internet) or in the context of a client and a server (i.e., where aspects are practiced on the client and the server). In some example embodiments, data-processing system 400 may be, for example, a stand-alone desktop computer, a laptop computer, a Smartphone, a tablet computing device, a networked computer server, and so on, wherein each such device can be operably connected to and/or in communication with a client-server based network or other types of networks (e.g., cellular networks, Wi-Fi, etc). The data-processing system 400 may communicate with a network, such as, for example, the wireless network 210 and/or the network 206 shown in FIG. 3. The data-processing system 400 can be, for example, a computer server such as one or more of the servers illustrated and discussed previously herein and/or a desktop computer, a laptop computer, a mobile computing device (e.g., a smartphone, tablet computing device) and so on. Examples of the data-processing system 400 include devices or systems such as the AS 208, the AS 209, the client device 205, the mobile device 204, the mobile device 203, and the mobile device 202 depicted in FIG. 3.

FIG. 5 illustrates a computer software system 450 for directing the operation of the data-processing system 400 depicted in FIG. 4. Software application 454, stored for example in the memory 342 of the data-processing system 400 can generally include one or more modules, an example of which is a module 452. The computer software system 450 also can include a kernel or operating system 451 and a shell or interface 453, which may include, for example, the previously discussed user interfaces. One or more application programs, such as the software application 454, may be "loaded" (e.g., transferred from, for example, mass storage or another memory location into the memory 342) for execution by the data-processing system 400.

The data-processing system 400 can receive inputs including one or more user commands and data through the interface 453. These inputs may then be acted upon by the data-processing system 400 in accordance with instructions from the operating system 451 and/or the software application 454. The interface 453 (e.g., a user interface, a GUI (Graphical User Interface), etc.) in some embodiments can serve to display results, whereupon a user (shown at the right hand side of FIG. 5) may supply additional inputs or can terminate a session. The software application 454 can include module(s) 452, which can, for example, implement instructions or operations such as, for example, the steps, operations or instructions shown and described herein with respect to the various blocks illustrated in FIG. 1 and FIG. 2. The module 452 may also be composed of a group of modules and/or sub-modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware). A module may also refer to a "course module" facilitated by a software application/module, which may also be referred to as a program module.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein refers to a collection of routines and data structures that can perform a particular task or implement a particular data type. A module may be composed of two parts: an interface, which can list the constants, data types, variable, and routines that can be accessed by other modules or routines, and an implementation, which may be private (e.g., accessible only to that module) and which can include source code that actually implements the routines in the module. The term module can also refer to an application, such as a computer program designed to assist in the performance of a specific task, such as word processing, accounting, inventory management, etc. A module may also refer to a physical hardware component or a combination of hardware and software.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for detecting a phishing attack on a computer device, comprising:
   scanning at least one email message;
   separating utilizing at least one tokenizer among a plurality of tokenizers, email parts from the at least one email message, in response to scanning the at least one email message, the email parts comprising all parts of the at least one email message essential for extracting phishing parameters;
   subjecting the email parts of the at least one email message to a feature extraction
   operation that reduces a number of features in a dataset with respect to the email parts by creating new features from existing features and discarding original features with respect to the at least one email message; and
   analyzing email features extracted from the email parts to determine whether or not any of the email features contain suspected phishing content, confirmed phishing content and benign email content wherein analyzing the email features extracted from the email parts further comprises:
   collecting the email features extracted from the email parts; and subjecting the email features after the feature extraction operation to AI (Artificial Intelligence) and machine learning model training prior to determining when any of the email features contain suspected phishing content, confirmed phishing content and benign email content.

2. The method of claim 1 wherein the at least one tokenizer parses raw email including the at least one email message and collects relevant information from the email parts essential for extracting physical parameters including at least one sender domain and at least one DMARC signature.

3. The method of claim 1 wherein the email parts separated from the at least one email message comprise:
   an email attachment, an email body, an email text body, an email header, and a network associated with the at least one email message,
   wherein the network is subject to feature extraction to extract host based features and non-standard parts associated with the network.

4. The method of claim 1 wherein analyzing email features extracted from the email parts further comprises analyzing HTML body data and text data associated with the at least one email message.

5. The method of claim 1 wherein scanning the at least one email message further comprises scanning the at least one email message on an on-demand basis.

6. The method of claim 1 wherein scanning the at least one email message further comprises scanning the at least one email message on a continuous basis and wherein the plurality of tokenizers include a first tokenizer and a second tokenizer, wherein the at least one tokenizer comprises the first tokenizer or the second tokenizer, wherein the first tokenizer breaks down the at least one email message into different parts and the second tokenizer extracts exact information/parameters required in a feature extraction stage.

7. A system for detecting a phishing attack on a computer device, comprising: at least one processor; and
   a non-transitory computer-usable medium embodying computer program code, the computer-usable medium capable of communicating with the at least one processor, the computer program code comprising instructions executable by the at least one processor and configured for:

scanning at least one email message;

separating utilizing at least one tokenizer among a plurality of tokenizers, email parts from the at least one email message, in response to scanning the at least one email message, the email parts comprising all parts of the at least one email message essential for extracting phishing parameters;

subjecting the email parts of the at least one email message to a feature extraction operation that reduces a number of features in a dataset with respect to the email parts by creating new features from existing features and discarding original features with respect to the at least one email message; and analyzing email features extracted from the email parts to determine whether or not any of the email features contain suspected phishing content, confirmed phishing content and benign email content wherein the instructions configured for analyzing the email features extracted from the email parts, further comprise instructions configured for:

collecting the email features extracted from the email parts; and subjecting the email features after the feature extraction operation to AI (Artificial Intelligence) and machine learning model training prior to determining if any of the email features contain suspected phishing content, confirmed phishing content and benign email content.

8. The system of claim 7 wherein the at least one tokenizer parses raw email including the at least one email message and collects relevant information from the email parts essential for extracting physical parameters including at least one sender domain and at least one DMARC signature.

9. The system of claim 7 wherein email parts separated from the at least one email message comprise at least one of: an email attachment, an email body, an email text body, an email header, and a network associated with the at least one email message.

10. The system of claim 7 wherein the instructions configured for analyzing email features extracted from the email parts, further comprise instructions configured for analyzing HTML body data and text data associated with the at least one email message.

11. The system of claim 7 wherein the instructions configured for scanning the at least one email message, further comprise instructions configured for scanning the at least one email message on an on-demand basis.

12. The system of claim 7 wherein the instructions for scanning the at least one email message further comprise instructions configured for scanning the at least one email message on a continuous basis and wherein the plurality of tokenizers include a first tokenizer and a second tokenizer, wherein the at least one tokenizer comprises the first tokenizer or the second tokenizer, wherein the first tokenizer breaks down the at least one email message into different parts and the second tokenizer extracts exact information/parameters required in a feature extraction stage.

\* \* \* \* \*